United States Patent [19]

Gillespie et al.

[11] Patent Number: 4,935,197

[45] Date of Patent: Jun. 19, 1990

[54] NEUTRON SHIELDS FOR NUCLEAR REACTOR CORE SUB-ASSEMBLIES

[75] Inventors: John W. Gillespie, Preston; Garry C. Crabtree, Chorley; Paul G. Giddins, Preston, all of United Kingdom

[73] Assignee: British Nuclear Fuels Plc, Warrington, England

[21] Appl. No.: 205,850

[22] Filed: Jun. 13, 1988

[30] Foreign Application Priority Data

Jul. 22, 1987 [GB] United Kingdom ............... 8717278
Jul. 22, 1987 [GB] United Kingdom ............... 8717279

[51] Int. Cl.⁵ .............................................. G21C 3/32
[52] U.S. Cl. .................................... 376/447; 376/440; 376/446
[58] Field of Search ............... 376/447, 419, 446, 435, 376/440, 287, 172, 363, 267

[56] References Cited

U.S. PATENT DOCUMENTS

| 3,238,105 | 3/1966 | McNelly | 376/172 |
| 3,368,945 | 2/1968 | Keller et al. | 376/435 |
| 3,573,169 | 3/1971 | Gumuchian | 376/435 |
| 4,493,813 | 1/1985 | Loriot et al. | 376/287 |
| 4,655,995 | 4/1987 | Freeman et al. | 376/447 |

FOREIGN PATENT DOCUMENTS

| 2135074 | 12/1972 | France. | |
| 2402923 | 4/1979 | France. | |
| 0907535 | 10/1962 | United Kingdom. | |
| 2159319 | 11/1985 | United Kingdom | 376/172 |

Primary Examiner—Daniel Wasil
Attorney, Agent, or Firm—William R. Hinds

[57] ABSTRACT

A nuclear reactor core sub-assembly is provided with a removable lifting head (12)/absorber pin (20) assembly. The absorber pins (20) are connected to the lifting head (12) in such a way that they can be disconnected, inverted and reconnected the other way round, either collectively as a unit or individually. This allows the same absorber pins to be used at least twice over in different sub-assemblies since only the absorber material closest to the core tends to become depleted during irradiation.

17 Claims, 5 Drawing Sheets

NEUTRON SHIELDS FOR NUCLEAR REACTOR CORE SUB-ASSEMBLIES

BACKGROUND OF THE INVENTION

This invention relates to nuclear reactor core sub-assemblies and, in particular, to the neutron shielding sections which may be incorporated in the upper ends of such sub-assemblies. The neutron shielding section may comprise an array of spaced, generally parallel, axially extending tubular pins containing pellets of a suitable neutron absorbing material such as boron carbide. Over the life of a typical fuel sub-assembly, it is found the neutron absorbing capacity of the neutron shielding section is only partly depeleted, primarily over a short axial section nearest to the fuel-bearing section of the sub-assembly.

FEATURES AND ASPECTS OF THE INVENTION

According to the present invention there is provided a nuclear reactor core sub-assembly comprising an elongate tubular wrapper which is provided with a lifting head at one end and a mounting member at the opposite end and encloses a fuel-bearing section intermediate its ends and a neutron-shielding section between the fuel-bearing section and the lifting head; the neutron shielding section comprising an array of spaced, generally parallel, axially extending tubular pins enclosing neutron-absorbing material, the absorbing pins being provided either individually or collectively with connectible and disconnectible attachment means at opposite ends of the pins for selectively releasably supporting the pins only at one end from the lifting head in each of two orientations such that the pins when in one orientation are inverted with respect to the other orientation and such that the pins are disconnectible from the lifting head and are reconnectible to the lifting head in inverted relation to their orientation prior to disconnection.

In this way, the lifting head and the associated neutron shielding section can be removed from a spent fuel-sub assembly, the shielding section inverted, and the lifting head and inverted shielded section reassembled with an unirradiated wrapper containing unirradiated fuel thereby making more efficient use of the absorbing material, which is costly to manufacture, enrich and fabricate.

Also according to the invention there is provided a nuclear reactor core sub-assembly as set forth above in which the wrapper and the lifting head are of generally polygonal section and the lifting head is inserted into the wrapper with its vertices in registry with those of the wrapper, the lifting head are rendered axially captive to the wrapper by pads releasably secured to the lifting head and received within openings or windows in the wrapper in such a way that the pads can be disconnected from the lifting head and withdrawn through the openings or windows to allow withdrawal of the lifting head from the wrapper.

Also according to the invention there is provided a nuclear reactor core sub-assembly comprising an elongate tubular wrapper which is provided with a lifting head at one end and a mounting member at the opposite end and encloses a fuel-bearing section intermediate its ends and a neutron-shielding section between the fuel-bearing section and the lifting head, the neutron shielding section comprising an array of spaced, generally parallel, axially extending tubular pins enclosing neutron-absorbing material, the absorbing pins being provided either individually or collectively with attachment means at opposite ends of the pins for selectively suspending the pins from the lifting head in each of two orientations such that the pins when in one orientation are inverted with respect to the other orientation whereby the pins are disconnectible from the lifting head and are reconnectible to the lifting head in inverted relation to their orientation prior to disconnection, the attachment means being arranged so that the entire array of absorbing pins can, as a unit, be disconnected, inverted and reconnected to the lifting head, the absorbing pins being engaged at each end with a grid structure and both grid structures being adapted to be releasably engaged with the lifting head, and locking means being provided for preventing separation of the lifting head and the grid structure connected thereto, the locking means being constituted by the wrapper, and the arrangement being such that the corners of the wrapper trap and prevent disengagement of intergaging elements of the lifting head and the connected grid structure.

Also according to the invention there is provided a nuclear reactor core sub-assembly comprising an elongate tubular wrapper which is provided with a lifting head at one end and a mounting member at the opposite end and encloses a fuel-bearing section intermediate its ends and a neutron-shielding section between the fuel-bearing section and the lifting head, the neutron shielding section comprising an array of spaced, generally parallel, axially extending tubular pins enclosing neutron-absorbing material, and the lifting head including a grid structure supported by the lifting head, the absorbing pins being provided either individually or collectively with attachment means at opposite ends of the pins for selectively suspending the pins from one side of the grid structure in each of two orientations such that the pins when in one orientation are inverted with respect to the other orientation whereby the pins are disconnectible from the grid structure and are reconnectible to the grid structure in inverted relation to their orientation prior to disconnection, the attachment means comprising axially extending screw threaded connections which are releasably engageable with corresponding screw threaded connections at the grid structure, the length of the attachment means being such as to provide ends thereof projecting beyond the other side of the grid structure, and locking means for preventing separation of the pins from the grid structure, the locking means comprising elongate members locatable at said other side of the grid structure in aligned recesses defined by the projecting ends of the attachment means.

Still further, according to the invention there is provided a nuclear reactor core sub-assembly comprising an elongate tubular wrapper which is provided with a lifting head at one end and a mounting member at the opposite end and encloses a fuel-bearing section intermediate its ends and a neutron-shielding section between the fuel-bearing section and the lifting head; the neutron shielding section comprising an array of spaced, generally parallel, axially extending tubular pins enclosing neutron-absorbing material, the absorbing pins being provided either individually or collectively with attachment portions at opposite ends of the pins, and a grid structure located at each end of the pins and with which grid structures the attachment portions are engaged, each said grid structure being constructed and arranged so as to be releasably engageable with the lifting head, so that the pins may be selectively supported only from one of the grid structures when said one grid structure is engaged with the lifting head, and said pins may be inverted by engaging the other said grid structure with the lifting head.

DESCRIPTION OF THE DRAWINGS

To promote further understanding of the invention, reference is now made to the accompanying drawings, in which.

DESCRIPTION OF PREFERRED EMBODIMENTS

Figure 1:
FIG. 1 is a side view of a fuel sub-assembly for use in the core of a liquid metal cooled fast neutron reactor.

Referring to FIG. 1, the sub-assembly shown is intended for a liquid sodium cooled fast neutron reactor and comprises a tubular wrapper 10 of hexagonal cross-section having at one end a lifting head 12 (see FIGS. 2 and 5) and, at the other end, a mounting member 14 in the form of a spike for engagement in the diagrid of a pool-type fast neutron reactor so that, in use, the sub-assembly is mounted with its longitudinal axis disposed generally vertically. Intermediate its ends, the wrapper 10 encloses a fuel-bearing section (not shown) in the form of a hexagonal array of spaced, generally parallel, axially extending pins containing nuclear fuel material which may be in pellet form.

The sub-assemblies are mounted side-by-side on the reactor diagrid and are spaced apart by spacing pads 16 which may be disposed at different levels according to the particular method of core constraint employed. Heat is extracted from the fuel-bearing sections of the sub-assemblies by primary liquid sodium coolant from a cold pool region of the reactor which enters via holes in the spike 14, flows upwardly past the fuel pins and emerges from the top ends of the assemblies into a hot pool region of the reactor. The coolant is then returned to the cold pool via intermediate heat exchangers in which heat transfer takes place between the primary coolant and a secondary coolant which may also be liquid sodium.

Above the fuel-bearing section, the sub-assembly incorporates a shielding section which, in both of the embodiments to be described, comprises a hexagonal array of pins 20 each containing pellets of a suitable neutron-absorbing material such as boron carbide or possibly a fertile material.

Figure 3A:
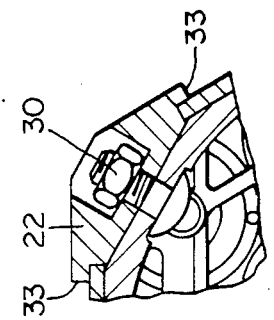
FIG. 3A is a fragmentary detail view in transverse section.
Figure 2:
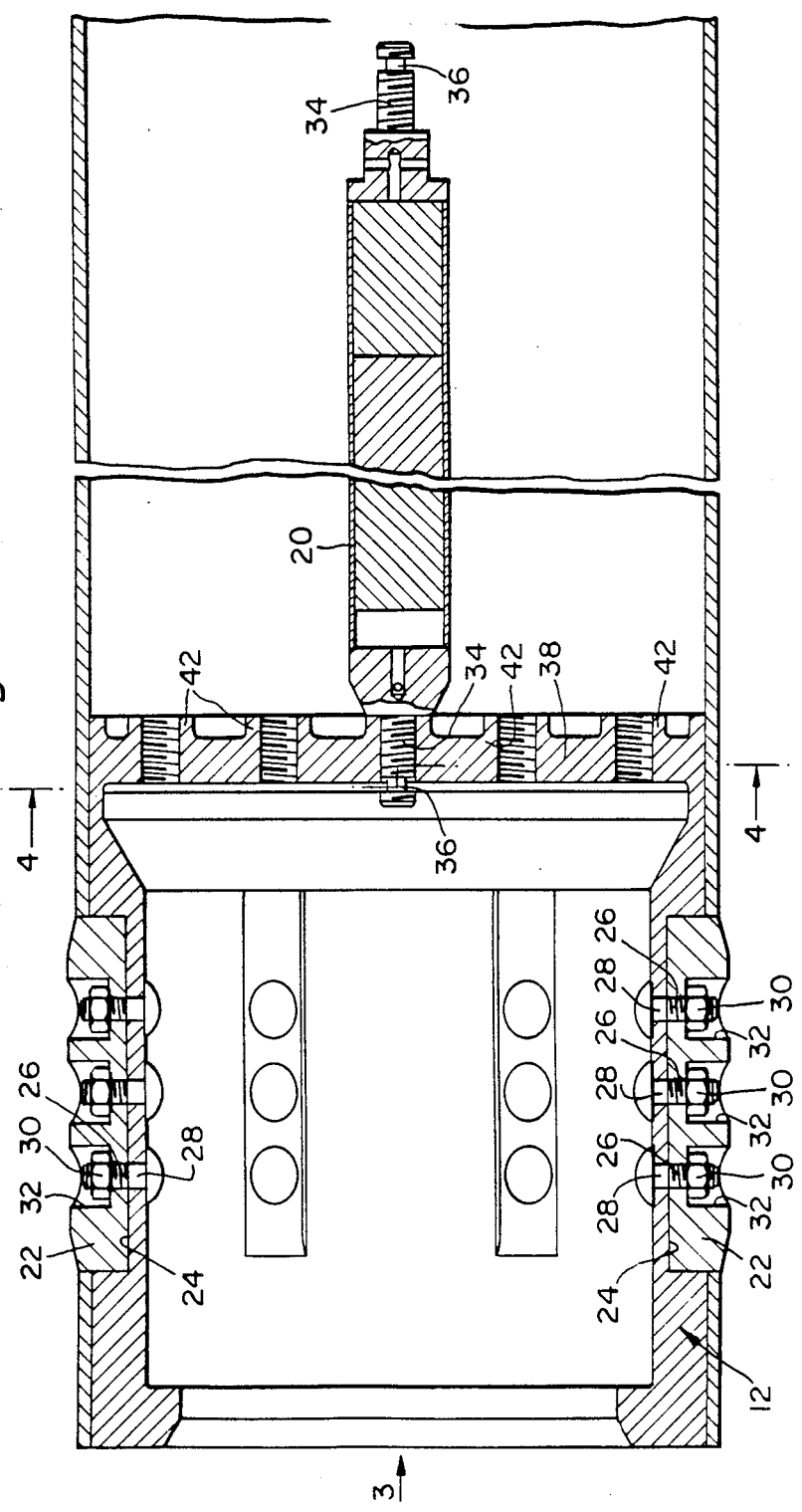
FIG. 2 is a longitudinal section, across the corners, of the top portion of one embodiment of a sub-assembly according to the invention.
Figure 5:
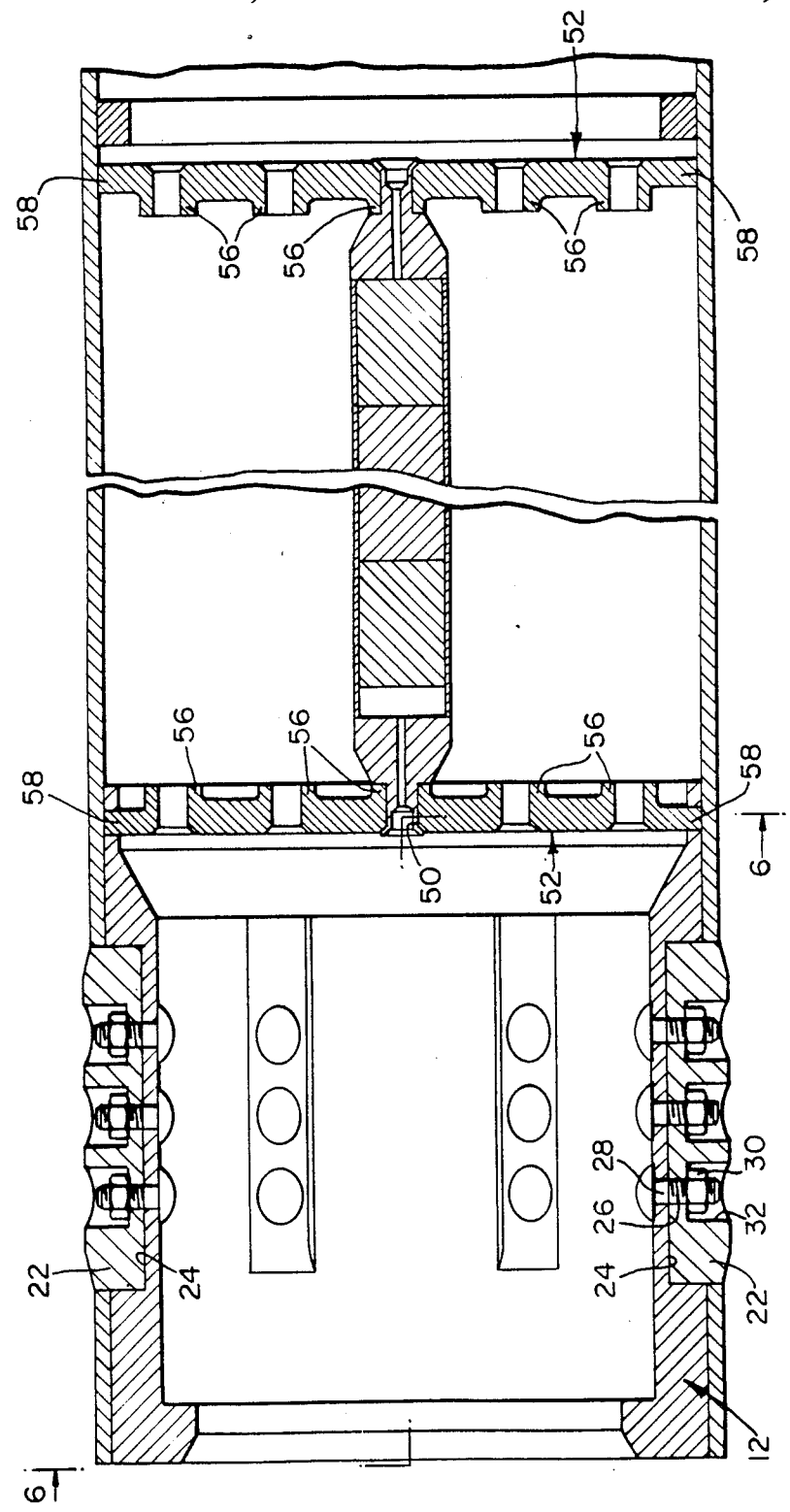
FIG. 5 is longitudinal section, across the corners, of the top portion of a second embodiment of a sub-assembly according to the invention.
Figure 6:
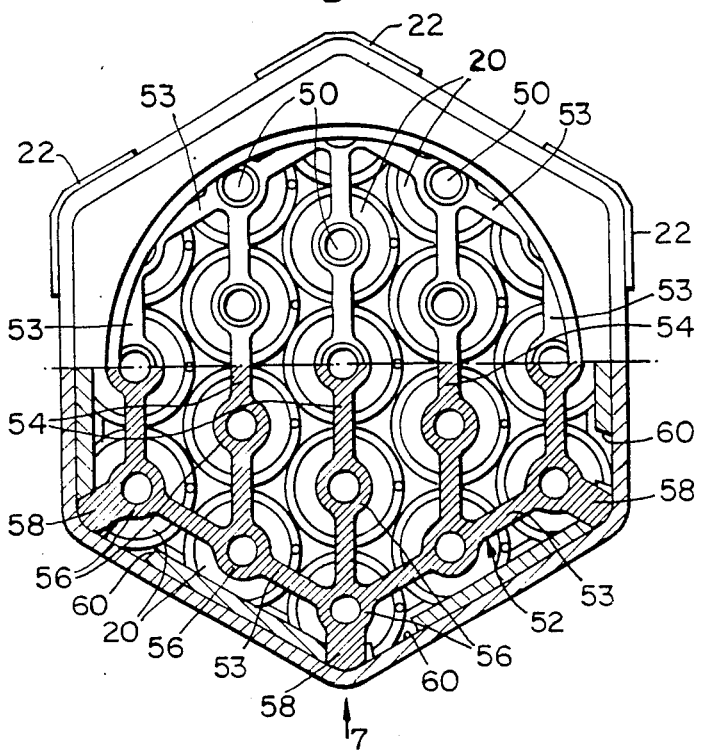
FIG. 6 is a sectional view in the direction 6—6 in FIG. 5.
Figure 7:
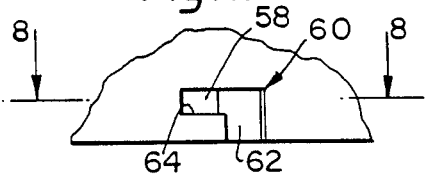
FIG. 7 is a fragmentary view of part of the lifting head, from the direction 7 in FIG. 6, showing the slot of a bayonet-type coupling with the neutron shielding section, the wrapper being omitted.
Figure 8:
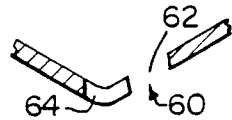
FIG. 8 is a section view in the direction 8-8 in FIG. 7.

The wrapper 10 and the lifting head 12 may be composed of a ferritic steel. Ferritic steels cannot be successfully bonded together by welding and, in order to achieve secure connection between the wrapper and the lifting head, mechanical jointing is employed. Referring to FIGS. 2, 5 and 3A, the mechanical jointing is effected by means of pads 22 which fit into recesses 24 machined into the corners of the hexagonal outer periphery of the lifting head 12 and are secured to the lifting head by screw-threaded fasteners comprising headed bolts 26, having non-circular shank portions 28 fitted into complementary holes in the base of the recess 24, and nuts 30 accommodated in sockets 32. The pads 22 are designed to be accessible through slots or windows in the corners of the wrapper so that they can be assembled to, and disconnected from, the lifting head externally of the wrapper Once assembled as shown in FIGS. 2 and 5 the pads 22 render the lifting head axially captive with the wrapper. However, when it is desired to dismantle the sub-assembly in preparation for reprocessing the fuel, the lifting head can be readily freed by releasing the nuts 30 and withdrawing the pads. The lifting head may then be re-used simply by re-assembling it to a new wrapper containing unirradiated fuel. As shown in the illustrated embodiments, the pads 22 project beyond the outer profile of the wrapper and serve the dual purpose of connecting together the lifting head and the wrapper and acting as spacing pads (see upper pads 16 in FIG. 1). In this case, as shown in FIG. 3A, the pads 22 are provided with lateral projections 33 which overlie the wrapper walls and hence act as clamps. However, in an alternative embodiment not shown) where spacing pads are not required adjacent the top end of the sub-assembly, the pads 22 may he designed so that, when secured to the lifting head, their outer surfaces are substantially flush with the outer surfaces of the wrapper walls, ie so that the pads 22 in this instance do not project beyond the hexagonal profile of the wrapper wall.

Figure 3:
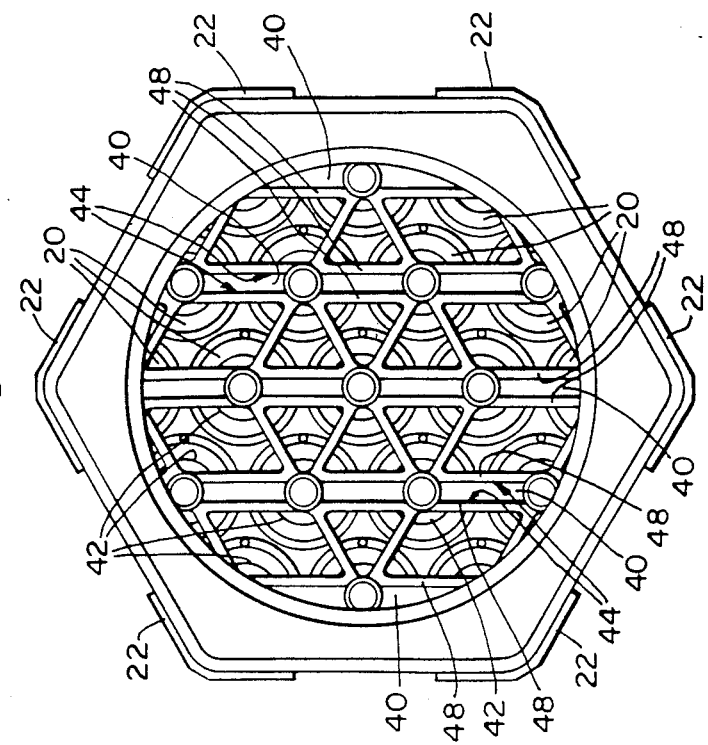
FIG. 3 is a view in the direction 3 in FIG. 2.
Figure 4:
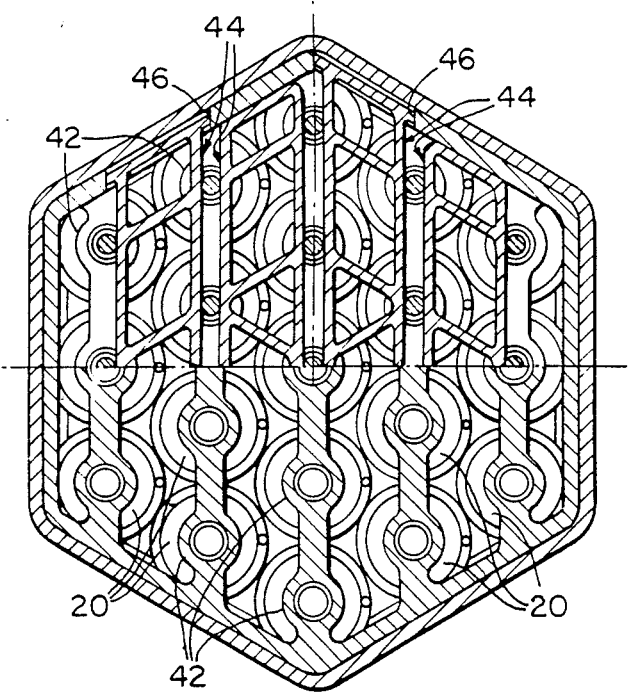
FIG. 4 is a sectional view in the direction 4—4 in FIG. 2.

Referring now to the embodiment of FIGS. 2-4, the neutron absorbing pins 20 are designed to be removable with the lifting head 12 as a unit and also invertable individually relative to the head 12. Each pin 20 terminates at both ends in substantially identical screw-threaded stems 34 formed with necks 36. The lifting head 12 has a base 38 comprising a series of spaced bars 40 formed with internally threaded bushes 42 into which the stems 34 of the pins 20 can be screwed, the arrangement being such that, when the stem 34 is fully screwed home, the neck 36 is located above the base 38—this applies whichever way round the pin is assembled to the base 38. Fingers 44 of reticulated configuration are inserted through apertures 46 in the sides of the lifting head (prior to assembly of the latter to the wrapper) so that the sides 48 of the fingers 44 enter the recesses afforded by the necks 36 thereby securely locking the pins 20 to the lifting head. During dismantling of the sub-assembly, the lifting head and the pins 20, may, on disconnection of the pads 22, be removed as a unit from the wrapper and reinserted into a fresh wrapper. Prior to re-insertion into the fresh wrapper, the pins 20 may be disconnected from the lifting head, inverted and reconnected, this being possible by virtue of the substantial identity of the stems 34 at the opposite ends of the pins. However, such inversion may not be necessary each time the lifting head is re-used since depletion of the absorbing material after one period of irradiation may not be so extensive as to require this. Thus, for example, inversion of the absorbing pins 20 may not be necessary until the lifting head/shielding section is coming up for re-use in a third period or irradiation.

Referring now to FIGS. 5–8, this embodiment differs from that of FIGS. 2–4 in that the shielding section can be inverted as a unit with respect to the lifting head. In this case, the pins 20 are connected at each end, via peened over stems 50, to hexagonal grids 52 of substantially identically configuration. Each grid 52 comprises hexagonal perimeter 53 and a series of parallel bars 54, the perimeter and bars being formed with bushes 56 for reception of the stems SO and location of the pins 20 in a hexagonal, spaced apart, array. At each vortex of the hexagonal perimeter 53 each grid is provided with a radial projection 58 for engagement, as a bayonet-type fitting, with slots 60 (see FIGS. 7 and 8) located at the vertices of the lifting head.

The slots 60 are L-shaped and have an entry portion 62 which is offset from the vertex and a lateral portion 64 into which the projection 58 fits when the grid is correctly engaged with the lifting head. When correct engagement is obtained, the projection 58 is aligned with the corresponding vertex of the lifting head. In this condition, the lifting head/absorbing pin assembly can be inserted into the wrapper and the projections 58 are then trapped by the vertices of the wrapper thus preventing disengagement of the absorbing pin assembly from the lifting head. The lifting head may therefore be secured in position by m eans of pads 22.

When the irradiated sub-assembly is subsequently removed from the reactor, the lifting head/absorbing pin assembly can, following disconnection of the pads 22, be removed as a unit. The absorbing pin array may then be separated from the lifting head, refitted the other way round; and the assembly can then be inserted into a fresh wrapper.

If desired, instead of the entire array of absorbing pins being invertable as a unit, the arrangement may be such that groups or sub-arrays of the pins are each invertable as a unit.

We claim:

1. A nuclear reactor core sub-assembly comprising an elongate tubular wrapper which is provided with a lifting head at one end and a mounting member at the opposite end and encloses a fuel-bearing section intermediate its ends and a neutron-shielding section between the fuel-bearing section and the lifting head; the neutron shielding section comprising an array of spaced, generally parallel, axially extending tubular pins enclosing neutron-absorbing material, the absorbing pins being provided either individually or collectively with connectible and disconnectible attachment means at opposite ends of the pins for selectively releasably supporting the pins only at one end from the lifting head in each of two orientations such that the pins when in one orientation are inverted with respect to the other orientation and such that the pins are disconnectible from the lifting head and are reconnectible to the lifting head in inverted relation to their orientation prior to disconnection.

2. A sub-assembly as claimed in claim 1 in which the attachment means is so arranged that disconnection, inversion and reconnection of the absorbing pins can be effected individually.

3. A sub-assembly as claimed in claim 1 in which the attachment means is so arranged that the entire array of absorbing pins can, as a unit, be disconnected, inverted and reconnected to the lifting head.

4. A sub-assembly as claimed in claim 2 in which each absorbing pin is provided with an attachment portion at each end, the attachment portions of each absorbing pin each being adapted for engagement with a grid structure associated with the lifting head.

5. A sub-assembly as claimed in claim 3 in which the absorbing pins are engaged at each end with a grid structure and both grid structures are adapted to be releasably engaged with the lifting head.

6. A sub-assembly as claimed in claim 5 in which the lifting head and each grid structure are provided with interconnectible bayonet-type fittings.

7. A sub-assembly as claimed in claim 5 including locking means for preventing separation of the lifting head and the grid structure connected thereto.

8. A nuclear reactor core sub-assembly comprising an elongate tubular wrapper which is provided with a lifting head at one end and a mounting member at the opposite end and encloses a fuel-bearing section intermediate its ends and a neutron-shielding section between the fuel-bearing section and the lifting head, the neutron shielding section comprising an array of spaced, generally parallel, axially extending tubular pins enclosing neutron-absorbing material, the absorbing pins being provided either individually or collectively with attachment means at opposite ends of the pins for selectively suspending the pins from the lifting head in each of two orientations such that the pins when in one orientation are inverted with respect to the other orientation whereby the pins are disconnectible from the lifting head and are reconnectible to the lifting head in inverted relation to their orientation prior to disconnection, the attachment means being arranged so that the entire array of absorbing pins can, as a unit, be disconnected, inverted and reconnected to the lifting head, the absorbing pins being engaged at each end with a grid structure and both grid structures being adapted to be releasably engaged with the lifting head, and locking means being provided for preventing separation of the lifting head and the grid structure connected thereto, the locking means being constituted by the wrapper, and the arrangement being such that the corners of the wrapper trap and prevent disengagement of intergaging elements of the lifting head and the connected grid structure.

9. A sub-assembly as claimed in claim 8 in which the wrapper, the lifting head and the grid structures are all of polygonal cross-section and in which the interengaging elements comprise L-shaped slots in the vicinity of the vertices of the lifting head and radial projections at the vertices of the grid structures, the slots and the projections being adapted to engage as bayonet-type fittings in such a way that, when correctly engaged, the projections are align with the vertices of the lifting head and, when the lifting head is inserted into the wrapper, are prevented from disengaging from the slots by the vertices of the wrapper.

10. A sub-assembly as claimed in claim 1 in which the lifting head is mechanically connected to the wrapper and, in which, one disconnection of the mechanical connections, the lifting head and the absorbing pin array is removable as a unit from the wrapper.

11. A nuclear reactor core sub-assembly as claimed in claim 1, in which the wrapper and the lifting head are of generally polygonal section and the lifting head is inserted into the wrapper with its vertices in registry with those of the wrapper, the lifting head being rendered axially captive to the wrapper by pads releasably secured to the lifting head and received within openings or windows in the wrapper in such a way that the pads can be disconnected from the lifting head and withdrawn through the openings or windows to allow withdrawal of the lifting head from the wrapper.

12. A sub-assembly as claimed in claim 11 in which the openings or windows are located at vertices of the wrapper.

13. A sub-assembly as claimed in claim 11 in which the pads project beyond the external polygonal profile of the wrapper so as to act, in use, as spacing pads for maintaining a minimum spacing between adjacent sub-assemblies of the reactor core.

14. A sub-assembly as claimed in claim 11 in which the externally presented faces of the pads lie within or substantially flush with the external polygonal profile of the wrapper.

15. A sub-assembly as claimed in claim 11 in which the pads locate within recesses formed in vertices of the lifting head.

16. A nuclear reactor core sub-assembly comprising an elongate tubular wrapper which is provided with a lifting head at one end and a mounting member at the opposite end and encloses a fuel-bearing section intermediate its ends and a neutron-shielding section between the fuel-bearing section and the lifting head, the neutron shielding section comprising an array of spaced, generally parallel, axially extending tubular pins enclosing neutron-absorbing material, and the lifting head including a grid structure supported by the lifting head, the absorbing pins being provided either individually or collectively with attachment means at opposite ends of the pins for selectively suspending the pins from one side of the grid structure in each of two orientations such that the pins when in one orientation are inverted with respect to the other orientation whereby the pins are disconnectible from the grid structure and are reconnectible to the grid structure in inverted relation to their orientation prior to disconnection, the attachment means comprising axially extending screw threaded connections which are releasably engageable with corresponding screw threaded connections at the grid structure, the length of the attachment means being such as to provide ends thereof projecting beyond the other side of the grid structure, and locking means for preventing separation of the pins from the grid structure, the locking means comprising elongate members locatable at said other side of the grid structure in aligned recesses defined by the projecting ends of the attachment means.

17. A nuclear reactor core sub-assembly comprising an elongate tubular wrapper which is provided with a lifting head at one end and a mounting member at the opposite end and encloses a fuel-bearing section intermediate its ends and a neutron-shielding section between the fuel-bearing section and the lifting head; the neutron shielding section comprising an array of spaced, generally parallel, axially extending tubular pins enclosing neutron-absorbing material, the absorbing pins being provided either individually or collectively with attachment portions at opposite ends of the pins, and a grid structure located at each end of the pins and with which grid structures the attachment portions are engaged, each said grid structure being constructed and arranged so as to be releasably engageable with the lifting head, so that the pins may be selectively supported only from one of the grid structures when said one grid structure is engaged with the lifting head, and said pins may be inverted by engaging the other said grid structure with the lifting head.

* * * * *